United States Patent
Bosch et al.

(10) Patent No.: US 7,920,866 B2
(45) Date of Patent: Apr. 5, 2011

(54) METHOD OF HARD HANDOVER IN A WIRELESS COMMUNICATION SYSTEM

(75) Inventors: Peter Bosch, New Providence, NJ (US); Sape J. Mullender, North Plainfield, NJ (US); Anil Rana, Morganville, NJ (US); Louis Gwyn Samuel, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 601 days.

(21) Appl. No.: 11/176,572

(22) Filed: Jul. 7, 2005

(65) Prior Publication Data
US 2007/0010250 A1    Jan. 11, 2007

(51) Int. Cl.
*H04W 36/00* (2009.01)
*H04W 4/00* (2009.01)

(52) U.S. Cl. ........ 455/436; 455/438; 455/439; 455/403; 455/422.1; 370/331

(58) Field of Classification Search ........ 455/432.1–463
See application file for complete search history.

(56) References Cited

U.S. PATENT DOCUMENTS

| | | | | |
|---|---|---|---|---|
| 2002/0075829 A1* | 6/2002 | Sakoda | | 370/332 |
| 2002/0107019 A1 | 8/2002 | Mikola et al. | | 455/436 |
| 2003/0067896 A1* | 4/2003 | Chuah et al. | | 370/331 |
| 2004/0005893 A1* | 1/2004 | Isobe et al. | | 455/436 |
| 2004/0029602 A1* | 2/2004 | Kunihiro | | 455/500 |
| 2005/0192010 A1* | 9/2005 | Kirla | | 455/438 |
| 2005/0215255 A1* | 9/2005 | Tanoue | | 455/436 |
| 2006/0039329 A1* | 2/2006 | Samuel et al. | | 370/335 |
| 2006/0056351 A1* | 3/2006 | Wall | | 370/331 |
| 2006/0056365 A1* | 3/2006 | Das et al. | | 370/338 |
| 2006/0067273 A1* | 3/2006 | Suman et al. | | 370/331 |
| 2008/0280611 A1* | 11/2008 | Miklos et al. | | 455/436 |

FOREIGN PATENT DOCUMENTS

| | | |
|---|---|---|
| EP | 1519519 | 3/2005 |
| EP | 1519519 A1 * | 3/2005 |
| WO | WO 0120938 | 3/2001 |
| WO | WO 0174095 | 10/2001 |

OTHER PUBLICATIONS

3GPP TS 25.133 V3 22.0 (Sep. 2005) Technical Specification Group Radio Access Network; Requirements for support of radio resource management (FDD) $3^{RD}$ *Generation Partnership Project* (Release 1999).
3GPP TR 25.931 V3.7.0 (Jun. 2002) Technical Specification Group RAN; UTRAN Functions, Examples on Signalling Procedures $3^{rd}$ *Generation Partnership Project* (Release 1999).
3GPP TS 25.322 V3.18.0 (Jun. 2004) Technical Specification Group Radio Access Network; Radio Link Control (RLC) protocol specification $3^{rd}$ *Generation Partnership Project* (Release 1999).
International PCT/US2006/025728 Search Report dated Dec. 7, 2006.

\* cited by examiner

*Primary Examiner* — Huy Phan
(74) *Attorney, Agent, or Firm* — Williams, Morgan & Amerson

(57) ABSTRACT

The present invention provides a method of wireless communication with a mobile unit and a base station router. The method may include providing, over a first channel, configuration information indicative of a second channel associated with the base station router and the mobile unit. The method may also include providing state information associated with the mobile unit to the base station router.

24 Claims, 4 Drawing Sheets

| UM | | #bytes |
|---|---|---|
| VT(US) | Last SN transmitted | 2 |
| VR(US) | Last SN received | 2 |

405

| AM | | #bytes |
|---|---|---|
| VT(S) | Last SN transmitted | 2 |
| VT(A) | Oldest ACKed SN | 2 |
| VT(WS) | Transmit window size | 2 |
| VT(PDU) VT(SDU) | PDU and SDU counters | 2 + 2 |
| VT(RST) | Reset counter | 2 |
| VT(SP) | VT(S) during last poll | 2 |
| VR(R) | First expected PDU | 2 |
| Rxmask | Bitmask of received PDUs | Max 512 |

410

| Header | | #bytes |
|---|---|---|
| Number | Bearer number | 1 |
| State | Current state of bearer | 1 |
| Seg state | Segmentation state | 1 |
| TFN | Target Frame Number | 1 |

METHOD OF HARD HANDOVER IN A WIRELESS COMMUNICATION SYSTEM

BACKGROUND OF THE INVENTION

1. Field of the Invention

This invention relates generally to a communication system, and, more particularly, to a wireless communication system.

2. Description of the Related Art

Mobile units communicate with a conventional wireless communication network over wireless communication links (or air interfaces) with one or more base stations or nodes-B. In one exemplary network architecture, the base stations are communicatively coupled to a controller, which is connected to the wireless communication network. For example, in a Universal Mobile Telecommunication System (UMTS) network, one or more base stations are communicatively coupled to a radio network controller (RNC) via an asynchronous transfer mode (ATM) switch. The base station typically handles layer-1 services such as channel coding and/or channel decoding. The radio network controller provides layer-2 services such as radio link control (RLC), packet data convergence protocol (PDCP), and medium access control (MAC), as well as layer-3 services such as terminating Internet Protocol traffic with the network.

A mobile unit in soft handover can maintain concurrent wireless communication links with more than one base station associated with a radio network controller. For example, a radio network controller may provide transport blocks to a plurality of base stations in an active set associated with a mobile unit. The base stations in the active set may then provide information in the transport blocks to the mobile unit over a corresponding plurality of air interfaces. The mobile unit combines information received over the plurality of air interfaces to decode the transport blocks. Similarly, the base station may provide information to the plurality of mobile units over the plurality of air interfaces. The radio network controller may then use the information received from the plurality of base stations to form packets that may be provided to the network. However, soft handover requires synchronization between backhaul links from the base stations to the radio network controller. The base stations and/or radio network controller may include jitter buffers to maintain the required degree of synchronization.

In one alternative wireless network architecture, base station routers (BSRs) may be used to provide wireless connectivity to mobile units. The base station routers are connected by a switch, which is communicatively coupled to the wireless communication network via a home agent. A base station router typically provides the functionality of a radio network controller and a base station in a single entity. For example, a base station router may provide layer-1, layer-2, and layer-3 services. Wireless communication networks that use base station routers do not require synchronous backhaul links. However, soft handover may be difficult to implement in wireless communication networks that include base station routers. For example, each base station router would need a relatively large jitter buffer to maintain synchronization between multiple base station routers. Large jitter buffers may lead to long round-trip delays.

Network architectures that include base station routers may therefore implement hard handovers (HHOs) between a source base station router (BSR) and a target BSR. The inter-BSR HHO is inspired by the standard inter-RNS HHO as described in 3 GPP TS 25.931. The inter-BSR HHO procedure may extend the inter-RNS handover procedure with support for lossless frame selector relocation. A conventional inter-RNS HHO procedure starts with a mobile unit reporting one or more channel conditions based on pilot strengths for the various pilots the mobile unit is able to decode to the source BSR. The source BSR determines whether a hard handover to a selected target BSR should be performed and, if so, the source BSR communicates with the target BSR to allocate uplink and downlink wireless channel resources. The target BSR may then initiate a new downlink radio channel. Once the downlink channel has been initiated, the target BSR responds to the source BSR, which transmits a layer-3 channel reconfiguration message over a signaling channel (DCCH-2) to the mobile unit. On reception, the mobile unit acquires radio frame synchronization before initiating a new uplink. As soon as the target BSR receives the request to start a new downlink channel, it also activates internal searchers to locate the new uplink from the mobile unit. Once the target BSR acquires uplink synchronization, it sends a Mobile Internet Protocol (MOIP) registration request to a home agent (HA) to inform the home agent of the new care-of address of the Mobile IP Foreign Agent (FA) inside the target BSR. On successful registration, the home agent tunnels downlink data to the target BSR.

The conventional inter-RNS hard handover procedure is not a lossless handover. First, data queued inside the radio layer control (RLC) bearers is lost during the handover, due to an implicit or explicit RLC reset. Accordingly, incomplete packets both in uplink and downlink may be discarded during the conventional hard handover. Since there is no mechanism available for layer-2 retransmission of the lost data, higher networking layers need to resolve the loss, e.g., using a Transmission Control Protocol (TCP) retransmission. Internet Protocol (IP) packets queued for transmission in the downlink may also be lost because the conventional inter-RNS handover does not typically forward this data between the source BSR and the target BSR. Consequently, data that is in flight from a home agent to the source BSR while the mobile unit is reconfiguring the uplink and downlink may also be lost because this data is not forwarded from the source BSR to the target BSR. The impact of not forwarding such data can be severe, as the MoIP re-registration does not happen until uplink synchronization has been re-established.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for hard handovers. The method may include providing, over a first channel, configuration information indicative of a second channel associated with the base station router and the mobile unit. The method may also include providing state information associated with the mobile unit to the base station router.

In another embodiment of the present invention, a method for hard handover is provided. The method may include receiving, over a first channel, configuration information indicative of a second channel associated with a second base station router. The method may also include reconfiguring to communicate over a second channel using the configuration information concurrently with state information associated with the mobile unit being provided to the second base station router by a first base station router.

In another embodiment of the present invention, a method for hard handover is provided. The method may include receiving a request from a base station router to allocate a channel to a mobile unit and providing configuration information indicative of the channel to the base station router. The method may also include receiving state information associated with the mobile unit from the base station router concurrently with reconfiguration of the mobile unit based on the configuration information.

BRIEF DESCRIPTION OF THE DRAWINGS

The invention may be understood by reference to the following description taken in conjunction with the accompanying drawings, in which like reference numerals identify like elements, and in which:

FIG. 4 conceptually illustrates one exemplary embodiment of state information that may be transmitted during an RLC state migration, in accordance with the present invention.

Figure 1:
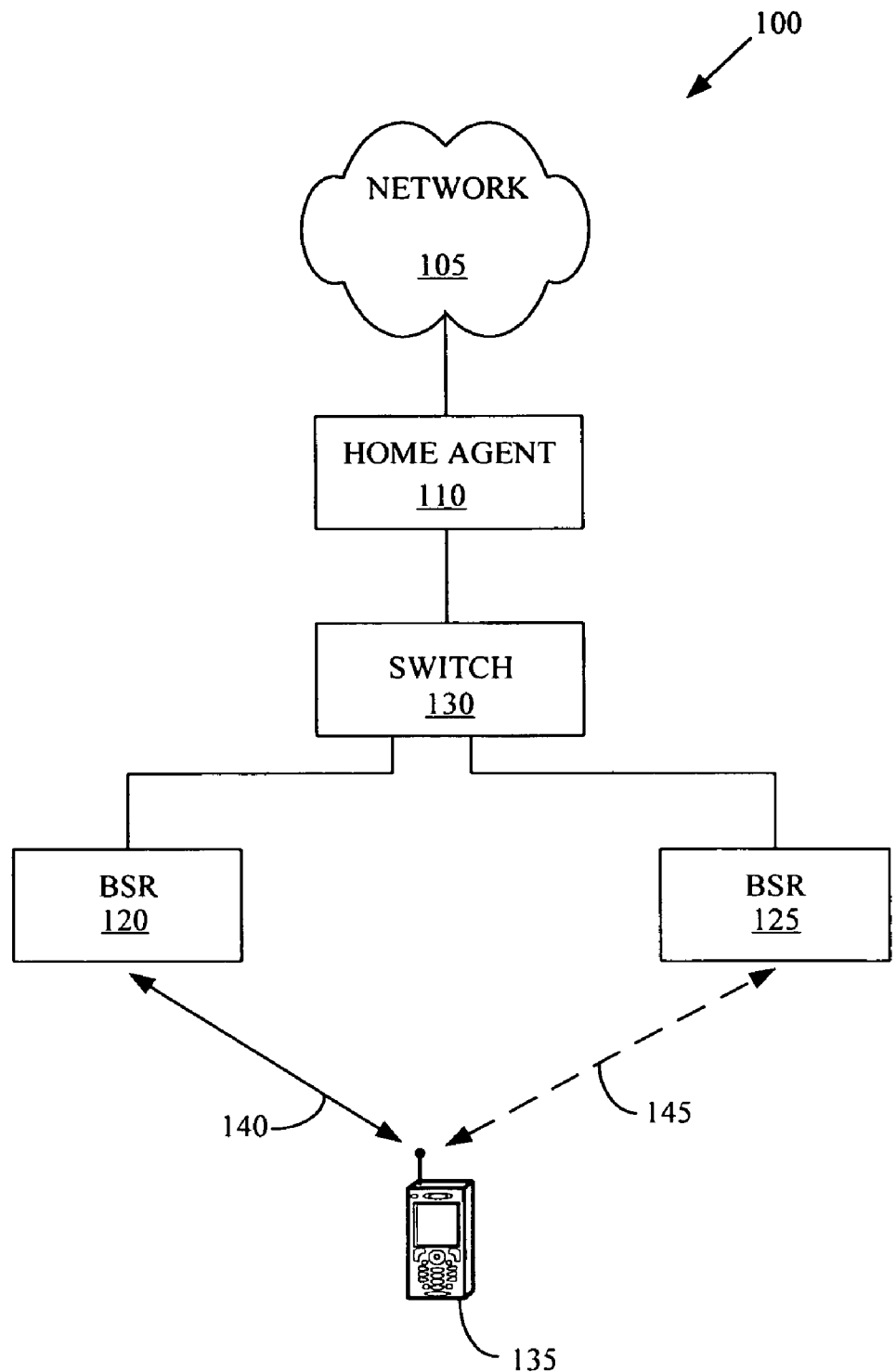
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a network 105, which may include a wired portion, a wireless portion, or any combination thereof. Exemplary networks 105 include, but are not limited to, Universal Mobile Telecommunication System (UMTS) networks, Global System for Mobile communications (GSM) networks, Code Division Multiple Access (CDMA or CDMA 2000) networks, and like. A home agent 110 is communicatively coupled to the network. The home agent 110 may include functionality for routing data to mobile nodes currently attached to one or more foreign agents, implemented by BSRs. Operation of the home agent 110 is known to persons of ordinary skill in the art and, in the interest of clarity, only those aspects of the operation of the home agent 110 that are relevant to the present invention will be discussed further herein.

One or more base station routers (BSRs) 120, 125 may be communicatively coupled to the home agent 110 so that the home agent 110 and the base station routers 120, 125 may exchange information. For example, on a downlink, the home agent 110 may provide Internet protocol packets to one or more of the base station routers 120, 125. For another example, on an uplink, one or more of the base station routers 120, 125 may provide Internet protocol packets to the home agent 110. In the illustrated embodiment, two base station routers 120, 125 are coupled to the home agent 110 via a switch 130, such as an IP switch. Although two base station routers 120, 125 are shown in FIG. 1, persons of ordinary skill in the art should appreciate that any number of base station routers 120, 125 may be included in the wireless communication system 100. Furthermore, the wireless communication system 100 may also include any number of home agents 110 and/or switches 130, as well as other elements not shown in FIG. 1.

The base station routers 120, 125 provide wireless connectivity to one or more mobile units 135. In one embodiment, the base station routers 120, 125 provide wireless connectivity to the mobile unit 135 according to a Universal Mobile Telecommunication Service (UMTS) protocol. However, in alternative embodiments, any protocol or combination of protocols may be used to provide wireless connectivity to the mobile unit 135. In the illustrated embodiment, the base station router 120 is communicatively coupled to the mobile unit 135 over an air interface (as indicated by the solid double arrow 140). The air interface 140 may include uplink and/or downlink channels that may be used to transmit information between the base station router 120 and the mobile unit 135.

In some circumstances, a new air interface (as indicated by the dashed double arrow 145) may be established between the mobile unit 135 and the base station router 125. In one embodiment, the air interface 145 is established as a part of a hard handover of the mobile unit 135 from the base station router 120 to the base station router 125. For example, the mobile unit 135 may provide a message to the base station router 125 reporting reception and successful decoding of a pilot channel from the base station router 125. The message from the mobile unit 135 may include information indicative of the measured pilot strength and/or a chip offset received with the pilot signal. The base station router 120 decodes the message and may determine that the mobile unit 135 should be handed over to the base station router 125.

The hard handover may be initiated when the base station router 120, which is the primary base station router in the illustrated embodiment, provides a request to the base station router 125 to allocate a channel of the air interface 145 to the mobile unit 135. In response, the base station router 125 provides configuration information, such as channel codes and/or scrambling codes of the uplink and/or downlink channels, to the base station router 120. In one embodiment, the base station router 120 provides the configuration information to the mobile unit 135 over the air interface 140 and concurrently provides state information associated with the mobile unit 135 to the base station router 125, as will be discussed in detail below. The base station router 120 may also provide downlink data intended for the mobile unit 135 to the base station router 125 and the base station router 120 may provide received uplink data from mobile unit 135 to base station router 125. The mobile unit 135 may reconfigure using the provided configuration information and then establish a new connection with the base station router 125 over the air interface 145. At the end of the procedure, mobile unit 135 can communicate with base station router 125 with little or no apparent interruption.

Figure 2:
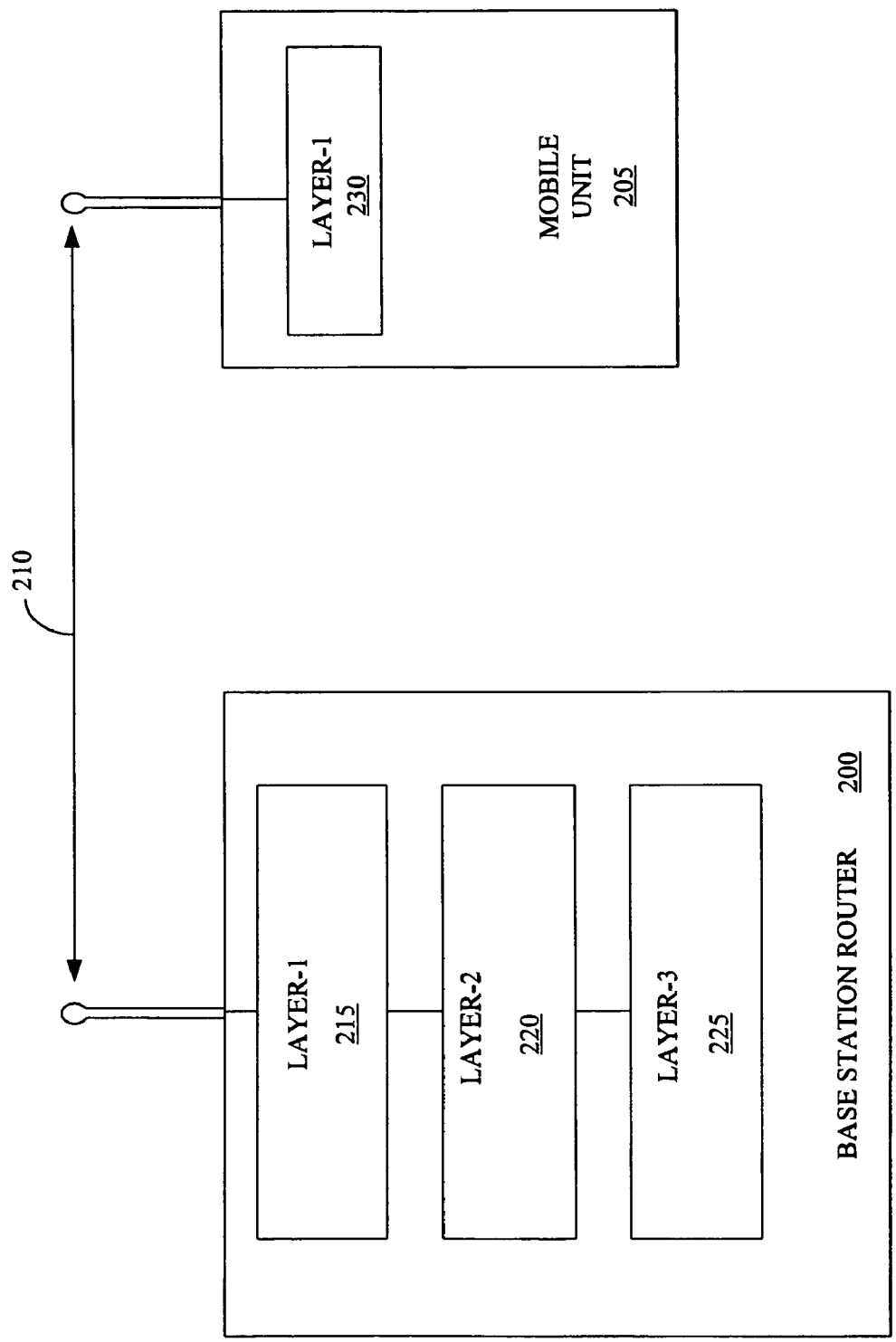
FIG. 2 conceptually illustrates one exemplary embodiment of a base station router and a mobile unit that communicate over an air interface, in accordance with the present invention.

FIG. 2 conceptually illustrates one exemplary embodiment of a base station router 200 and a mobile unit 205 that communicate over an air interface 210. The base station router 200 includes modules for implementing multiple layer services 215, 220, 225. In the illustrated embodiment, the base station router 200 includes a module 215 for implementing layer-1 services, a module 220 for implementing layer-2 services, and a module 225 for implementing layer-3 services. The mobile unit 205 may also include one or more modules for implementing layer services. In the illustrated embodiment, the mobile unit 205 includes a module 230 for implementing layer-1 services. Persons of ordinary skill in the art should appreciate that the modules 215, 220, 225, 230 may be implemented in a single entity or in a plurality of entities, and the modules 215, 220, 225, 230 may be implemented as software, firmware, hardware, or any combination thereof. Furthermore, the base station router 200 and/or the mobile unit 205 may include additional modules and/or other entities not shown in FIG. 2.

As used herein and in accordance with common usage in the art, the term "layer-1" refers to functionality that provides for transparent transmission of a bit stream between data link entities, such as a bit stream transmitted between the base station router 200 and the mobile unit 205 over the air interface 210. Layer-1 may also referred to as the physical layer, e.g., the Open System Interconnection (OSI) Physical Layer. Accordingly, in one embodiment, the layer-1 modules 215, 230 may implement channel coding and/or decoding, such as baseband encoders and/or decoders. The layer-1 modules 215, 230 use configuration information to provide for transparent transmission of the bit stream. In various embodiments, the configuration information may include channel and/or scrambling codes associated with an uplink and/or a downlink channel, as well as timing information such as frame and/or chip offsets.

As used herein and in accordance with common usage in the art, the term "layer-2" refers to functionality that provides for synchronizing the bit stream flowing to and from the physical layer (e.g., the layer-1 module 215) and for detecting errors due to transmission problems such as noise, interference, and the like. Layer-2 may also be referred to as a traffic layer or a data link layer such as the Open Systems Interconnection Data Link Layer. The layer-2 module 220 may include functionality for implementing radio link control, packet data convergence protocol, medium access control, and the like. As used herein and in accordance with common usage in the art, the term "layer-3" refers to functionality that provides paths for the transfer of data between systems and across networks. Layer-3 may be referred to as the network layer, such as the Open Systems Interconnection Network Layer. For example, the layer-3 module 225 may implement functionality for handling Internet protocol traffic and/or signaling.

The current state of the layer-2 and/or layer-3 modules 220, 225 is represented as state information. As used herein in accordance with common usage in the art, the term "state information" refers to information that is used to indicate a state of the layer-2 and/or layer-3 modules 220, 225 associated with communication with the mobile unit 205. The state information may also be referred to as user-plane state information. In one embodiment, the state information includes radio link control (RLC) state information, which may include information in one or more data structures associated with one or more radio bearers and packet data units (PDUs) that may be stored in receive and/or transmit windows.

Figure 3:
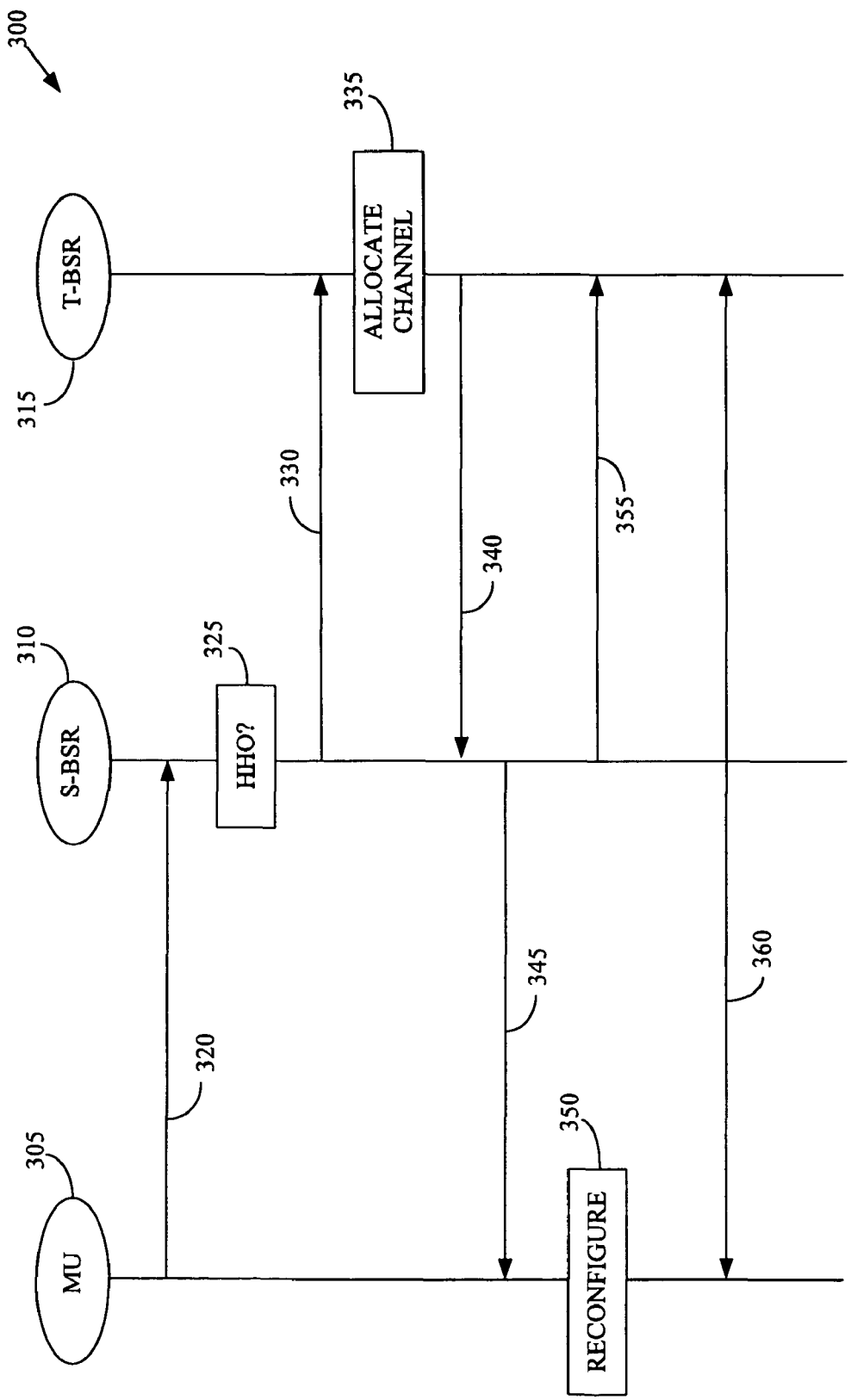
FIG. 3 conceptually illustrates one exemplary embodiment of a method for performing a hard handover, in accordance with the present invention.

FIG. 3 conceptually illustrates one exemplary embodiment of a method 300 for performing a hard handover. In the illustrated embodiment, a mobile unit (MU) 305 is handed over from a source base station router (S-BSR) 310 to a target base station router (T-BSR) 315. In the illustrated embodiment, the mobile unit 305 reports one or more channel conditions to the source base station router 310, as indicated by arrow 320. For example, the mobile unit 305 may use a measurement message to report one or more pilot strengths for the various pilots it is able to decode to the source base station router 310. The source BSR 310 determines (at 325) whether to perform a hard handover to a selected target BSR 315. If the source BSR 310 decides (at 325) to perform a hard handover of the mobile unit 305, then the source BSR 310 provides a message (as indicated by the arrow 330) to the target BSR 315 requesting the target BSR 315 to allocate channel resources to the mobile unit 305. The target BSR 315 may allocate (at 335) uplink and/or downlink wireless channel resources to the mobile unit 305 in response to receiving the request from the source BSR 310. Allocating (at 335) channel resources may include determining configuration information associated with the allocated channel. For example, the configuration information typically comprises channelization codes and/or scrambling codes associated with the uplink and/or downlink channels. The target BSR 315 provides the configuration information to the source BSR 310, as indicated by the arrow 340.

The source BSR 310 may then provide a message to the mobile unit 305 that includes the configuration information, as indicated by the arrow 345. In one embodiment, the source base station router 310 provides a layer-3 physical channel reconfiguration (PCR) message that includes information instructing the mobile unit 305 to tune to the newly allocated radio channel. The reconfiguration message may instruct the mobile unit 305 to reconfigure the layer-1 parameters and to leave the layer-2 and layer-3 information untouched. The channel reconfiguration message may be sent on the same radio channel that is about to be reconfigured by the mobile unit 305. The mobile unit 305 may then reconfigure (at 350) using the configuration information so that the mobile unit 305 may communicate with the target BSR 315 over the newly allocated channel. In one embodiment, the mobile unit 305 may not communicate on the old and/or the new radio channel while it is reconfiguring (at 350).

The source BSR 310 also provides state information associated with the mobile unit 305 to the target BSR 315, as indicated by the arrow 355. The state information may include layer-2 state information such as a header compression state and a radio link control state, as well as layer-3 state information such as mobile sign-on information between the source base station router 310 and the target base station router 315. In one embodiment, the source BSR 310 provides the state information concurrently with reconfiguration (at 350) of the mobile unit 305. For example, the source BSR 310 may determine that the mobile unit 305 has disconnected from the channel to the source BSR 310 and may then initiate migration of state information to the target BSR 315. In one embodiment, migration of the state information includes migration of radio link control state information. The radio link control (RLC) state migration may include marshaling data structures associated with RLC bearers used to communicate with the mobile unit 305, sending that state over the backhaul to the target BSR 315, and un-marshaling the state at the target BSR 315.

In one embodiment, the mobile unit 305 may begin to use the newly allocated channel by providing a pilot signal over the newly allocated channel. The mobile unit 305 may also transmit a reconfiguration complete (such as PCR-C) message indicating that the reconfiguration succeeded. The target base station router 315 may begin to use the newly allocated channel as soon as it determines that this channel is "alive" by detecting the pilot signal and/or the PCR-C message. The layer-2 state information is transmitted between the source base station router 310 and the target base station router 315 substantially before reception of the PCR-C message. For example, a message with a radio link control sequence number n may be sent to the mobile unit 305 in the last uplink packet sent over the old channel.

The target base station router 315 may then anticipate arrival of a message having a radio link control sequence number n+1 by using the relocated state so that the new message is not discarded. Not having the relocated state may initiate a radio link control resynchronization procedure with the mobile unit 305 and may discard data. Similarly, if the first message in a downlink from the target base station router 315 does not match the sequence number expected by the mobile unit 305, the mobile unit 305 may initiate a radio link control resynchronization procedure. The resynchronization procedure may lead to loss of the PCR-C message and/or pending data messages and/or service interruptions for the application that is currently using the radio channel. For example, the resynchronization may interrupt voice services and/or reduce the capacity of data services. In the illustrated embodiment, and as described in 3 GPP 25.133 "Requirements for support of radio resource management," both uplink and downlink may be temporarily suspended while the mobile unit 305 and target base station router 315 re-synchronize. Accordingly, there should be a radio silence for some period of time during which the state information may be migrated from the source BSR 310 to the target BSR 315.

The RLC state information may be forwarded from the source BSR 310 to the target BSR 315 beginning at a particular time and/or frame number. In one embodiment, the outgoing physical channel reconfiguration (PCR) message may be timed inside the traffic plane. The traffic plane may include a packet data convergence protocol (PDCP) later, an RLC layer, and a MAC layer. For example, RLC handlers inside the protocol stack may be adapted to detect transmission of the PCR message and to record a cell system frame number of the frame that delivers the PCR message to the mobile unit 305. The RLC state migration procedure may be activated as soon as the mobile unit 305 has received the PCR message.

Once the mobile unit 305 has suspended its uplink and downlink for internal layer-1 reconfiguration, the source base station router 310 suspends data processing. For example, the source base station router 310 may stop sending PDUs to the mobile unit 305 since the mobile unit 305 cannot receive packets anymore. If the source base station router 310 were to continue transmitting PDUs to the mobile unit 305 after the uplink and downlink have been suspended, these packets would be lost in the transmission and would have to be resent by a costly RLC retransmission. Once suspended, the source base station router 310 may initiate the RLC relocation by copying the RLC state from source BSR 310 to the target BSR 315. Transport blocks received in the uplink after the RLC state has been migrated may be forwarded to the target BSR 315, which may handle routing the transport blocks to the mobile unit 305. The act of wrapping up the RLC state may be performed atomically and may constitute a frame selector move.

The RLC state may be comprised of two parts: data structures associated with transmit and/or receive windows and the PDUs stored inside the receive and/or transmit windows. To avoid bearer resets, the target BSR 315 may receive the migrated RLC states before the uplink is resynchronized. The RLC PDUs themselves may be sent at a slower pace over the backhaul. In the uplink, some service data units (SDUs) may not be reassembled up until point data is forwarded from the source BSR 310 to the target BSR 315, but RLC status reports can still be formulated. Accordingly, even when the backhaul is slow, the target BSR 315 may still be capable of making progress with the RLC bearers even though it may not yet have received the entire set of receive and/or transmit RLC PDUs.

In one embodiment, a portion of the RLC of the source BSR 310 may be transmitted to the target BSR 315 with the channel allocation message 330. For example, the RLC layer of the target BSR 315 can be primed with RLC state information transmitted with the channel allocation message 330. In the event that the backhaul is extremely slow, the RLC state information sent together with the inter-BSR Radio Link Setup message may be used to prime the RLC state of the target BSR 315 so that the RLC state of the target BSR 315 is only slightly out-of-date by the time the actual relocation is performed. In this event, RLC resets may be avoided, at the expense of having to retransmit the RLC PDUs that were transmitted between the time the radio channels were set up and the time the channel is actually reconfigured.

FIG. 4 conceptually illustrates one exemplary embodiment of state information that may be transmitted during an RLC state migration. In the illustrated embodiment, the state for each bearer is preceded by a bearer header 400. The bearer header 400 may contain a bearer number (e.g., DCCH-1 to DCCH-4 and/or DTCH), a current operating mode or state of the bearer, and a current segmentation state of the bearer. The latter may be required for the target BSR to proceed with segmentation where the source BSR left off. The bearer header 400 may also contain a Target Frame Number (TFN) which indicates a frame number that may be used by the target BSR when it resumes operating the bearers. In one embodiment, the bearer header 400 has a fixed size of 4 bytes.

The bearer header 400 may be followed by one or more mode specific trailers 405, 410. In the illustrated embodiments, the trailer 405 is an unacknowledged mode (UM) trailer and the trailer 410 is an acknowledged mode (AM) trailer. To migrate the UM trailer 405 between base station routers, the parameters VT(US) and VR(US) may allow the target BSR to continue operating the bearer. In the illustrated embodiment, VT(US) presents the first unused sequence number and VR(US) represents the last received sequence number from the mobile. The RLC-UM may use these parameters to assign new sequence numbers for new transmission and to verify a PDU is received in sequence.

The AM trailer 410 may also include information indicative of an acknowledgement state associated with the source base station router. Accordingly, receive and transmit parameters VT, VR may be forwarded to the target BSR to enable the target BSR to pre-initialize the receive and/or transmit windows. The parameters shown in FIG. 4 are discussed in detail in 3 GPP TS 25.322.

The AM trailer 410 may also include a bit mask of the receive window to indicate the PDUs that have been received by the source BSR. The target BSR may then be able to formulate RLC-AM status report messages if the mobile unit requests a status report message in the event the actual PDUs are still in flight to the target BSR. Knowledge of received PDUs may be used to formulate the status report message, even though the data itself is not required. The target BSR initializes the receive window by marking the already received PDUs as unavailable while the PDUs are in flight from source to target BSR. For as long as an SDU contains unavailable parts, the SDU cannot be reassembled. Since a receive window is typically small, e.g. 128 entries, at most the receive window worth of bits need to be transmitted with the state message.

In the illustrated embodiment, the RLC state header is followed by a sequence of PDUs from source to target. These PDUs are unacknowledged transmit PDUs, followed by a series of received PDUs that are not yet reassembled and followed by the IP queue of un-segmented IP packets that are stored in the IP queue. Note that the procedure requires that all PDUs eventually arrive at the target. In one typical embodiment, a state migration may use 36 bytes for a RLC-AM bearer with a receive window size of 128 entries, 8 bytes for a RLC-UM bearer, 4 bytes for a RLC-TM bearer, or 152 bytes in total for a typical DCCH-1 to DCCH-4 and a DTCH bearer.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of wireless communication involving a mobile unit and a first and a second base station router, comprising:
   receiving, at the first base station router from the second base station router, over a first channel, configuration information used by the second base station router to set up a second channel associated with the second base station router and the mobile unit; and
   providing, from the first base station router and to the second base station router, state information associated with the mobile unit concurrently with the reconfiguration of the mobile unit to communicate with the second base station router on the second channel.

2. The method of claim 1, comprising providing from the first base station router and to the second base station router, a request to allocate the second channel to the mobile unit.

3. The method of claim 2, comprising receiving the configuration information used to set up the second channel in response to providing the request to allocate the second channel.

4. The method of claim 3, wherein receiving said configuration information comprises receiving at least one of a channelization code and a scrambling code associated with the second channel.

5. The method of claim 1, comprising providing said configuration information from the first base station router to the mobile unit.

6. The method of claim 5, wherein providing said configuration information to the mobile unit comprises providing a reconfiguration control message including at least one of a channelization code and a scrambling code associated with the second channel.

7. The method of claim 1, wherein providing said state information comprises:
   determining that the mobile unit has disconnected from the first channel; and providing said state information in response to determining that the mobile unit has disconnected from the first channel.

8. The method of claim 7, wherein providing said state information comprises providing said state information substantially before the mobile unit begins communicating using the second channel.

9. The method of claim 1, wherein providing the state information comprises providing at least one of layer-1 state information, layer-2 state information and layer-3 state information.

10. The method of claim 1, wherein providing the state information comprises providing physical layer state information.

11. The method of claim 1, comprising providing uplink and downlink information associated with the mobile unit to the second base station router.

12. A method of wireless communication involving a mobile unit and first and second base station routers, comprising:
   receiving at the mobile unit, over a first channel from the first base station router, configuration information indicative of a second channel associated with the second base station router and the mobile unit; and
   reconfiguring the mobile unit to communicate with the second base station router over the second channel using the configuration information concurrently with state information associated with the mobile unit being provided to the second base station router by the first base station router.

13. The method of claim 12, wherein receiving said configuration information comprises receiving at least one of a channelization code and a scrambling code associated with the second channel.

14. The method of claim 12, wherein receiving said configuration information comprises receiving a reconfiguration control message.

15. The method of claim 12, wherein reconfiguring to communicate over the second channel comprises maintaining at least one of layer-2 state information and layer-3 state information during the reconfiguration.

16. The method of claim 12, comprising disconnecting from the first channel in response to receiving the configuration information.

17. The method of claim 12, comprising providing at least one signal over the second channel substantially after reconfiguring.

18. A method of wireless communication involving a mobile unit and a first and a second base station router, comprising:
   receiving a request at the second base station router from the first base station router to allocate a channel to the mobile unit;
   providing, to the first base station router from the second base station router, configuration information used to set up the channel;
   receiving state information associated with the mobile unit from the first base station router concurrently with reconfiguration of the mobile unit based on the configuration information.

19. The method of claim 18, wherein providing said configuration information comprises providing at least one of a channelization code and a scrambling code associated with the channel.

20. The method of claim 18, wherein receiving the state information comprises receiving at least one of layer-1 state information, layer-2 state information and layer-3 state information.

21. The method of claim 18, wherein receiving the state information comprises receiving physical layer state information.

22. The method of claim 18, comprising receiving at least one signal from the mobile unit over the channel.

23. The method of claim 18, comprising receiving uplink and downlink information associated with the mobile unit.

24. The method of claim 18, comprising providing at least one signal to the mobile unit over the channel.

* * * * *